Figure 1:
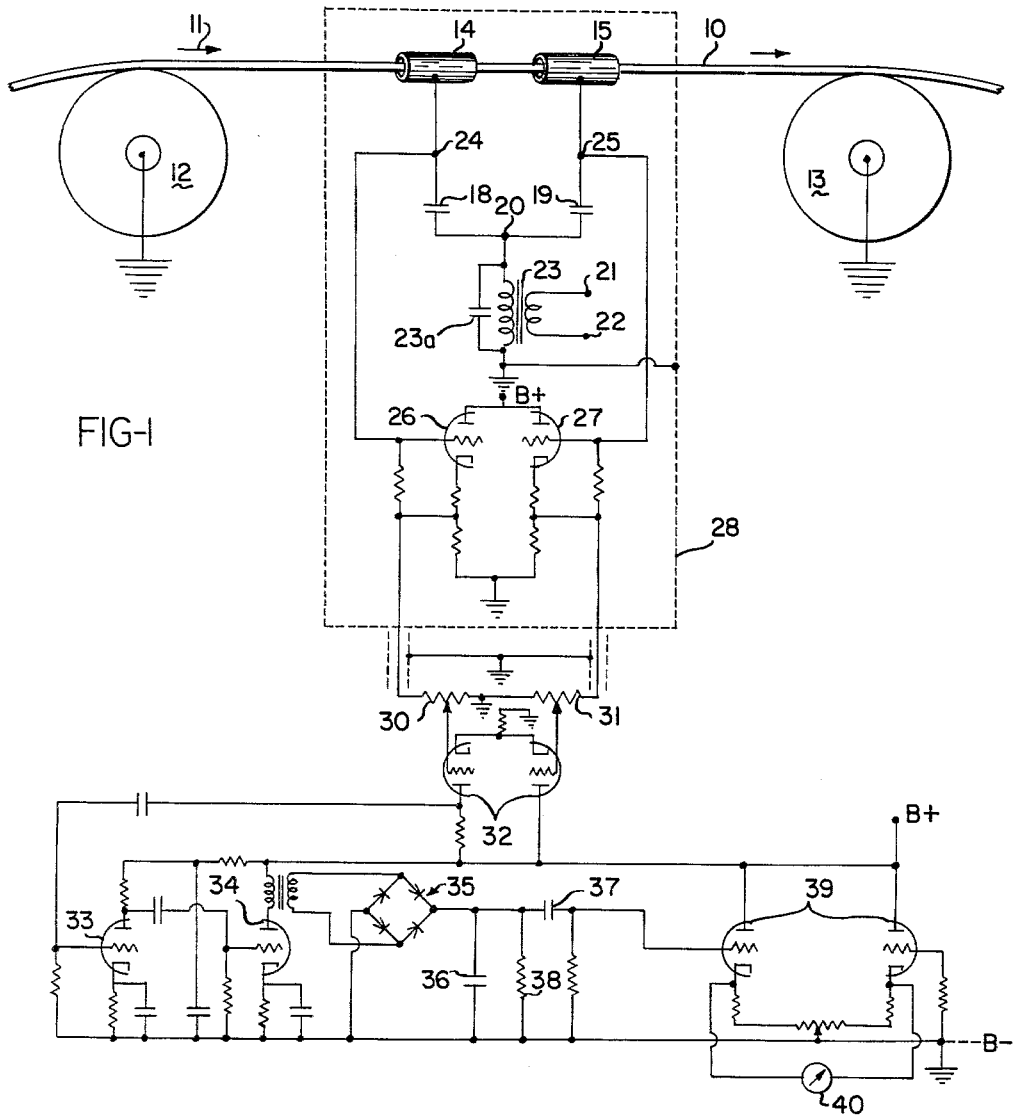

March 15, 1966   G. F. QUITTNER   3,241,061
FLAW FINDING APPARATUS HAVING CAPACITIVE SENSORS SPACED
APART ALONG LINE OF MOVEMENT OF A METALLIC SAMPLE
WHILE INCLUDED IN A BRIDGE CIRCUIT FEEDING
A DIFFERENCE AMPLIFIER
Filed July 10, 1961

*INVENTOR.*
GEORGE F. QUITTNER
BY *Richard MacCutcheon*
ATTORNEY

# United States Patent Office 3,241,061
Patented Mar. 15, 1966

3,241,061
FLAW FINDING APPARATUS HAVING CAPACITIVE SENSORS SPACED APART ALONG LINE OF MOVEMENT OF A METALLIC SAMPLE WHILE INCLUDED IN A BRIDGE CIRCUIT FEEDING A DIFFERENCE AMPLIFIER
George F. Quittner, Cleveland Heights, Ohio, assignor, by mesne assignments, to API Instruments Company, Chesterland, Ohio, a corporation of Ohio
Filed July 10, 1961, Ser. No. 122,748
3 Claims. (Cl. 324—61)

The present invention relates to equipment for detecting flaws in a sample.

For the continuous non-destructive testing of wires, rods, and the like, particularly those coated with a relatively thick more conductive material coating (e.g., steel wire which is aluminum or copper coated) it has been known to use eddy current devices. But the conventional devices present difficulties in finding surface defects such as sizeable pits in the coating, flakes off sections, surface inclusions of non-conductive material, and the like, because the eddy currents, which flow generally circumferentially, are affected by such non-sought for discontinuities as changes beneath the surface in circumferential conductivity, or changes in magnetic properties perhaps due to poor bonding between, or eccentricity of, core and coating, and which, with the prior techniques, could not be distinguished from such surface defects as are harmful to the product and lead to rejection or failure.

Additionally, in the past, reflected light beams have been used to find surface defects, but such beams frequently signal coloration changes which are insignificant and due merely to wire die lubricant, or dirt, etc. Other prior art apparatus has used rubbing feeler devices which operate mechanical transducers but are subject to wear and often mark the product harmfully.

It is an object of the present invention to provide simple and stable apparatus for overcoming the above difficulties.

Another object is to provide "no-contact" means for detecting surface defects which means are minimally subject to signals due to "no-defect" causes.

Another object of the invention is to provide means which without any rubbing or other contact (between sample and sensing means) more accurately locates regions of high resistivity to distinguish between such regions and other conditions which may produce unwanted signals.

According to one aspect of the invention I meet these objects by use of an alternating current excited capacitance bridge having two active legs adjacent the same electrical node which node is grounded and physically comprises the sample itself, with the legs being tubes which surround the sample without contact and by capacitance coupling read sought for flaws according to time difference while disregarding unsought for noise sources which almost always appear the same to both electrodes. Thus all that need be added are means for balancing the bridge and/or measuring unbalance voltages caused by presence of a sample surface defect under one capacitive sensing electrode at a different time than when the defect is present equally under the other capacitive sensing electrode as for alarm signal marking devices actuable when flaw signals exceed a predetermined value.

Figure 2:
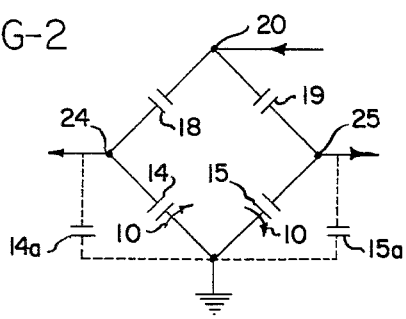
Figure 3:
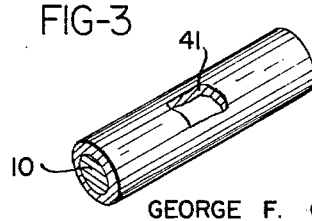

Other objects and advantages will become apparent and the invention may be better understood from consideration of the following description taken in connection with the following drawings, in which:

FIG. 1 is a schematic diagram which shows a preferred physical arrangement of sensing electrodes and preferred electrical circuitry;

FIG. 2, for explanatory purposes is a redrawing of a portion of the circuit of FIG. 1;

FIG. 3 is a view showing a typical copper or aluminum coated steel reinforcing core with the coating having a large flaw of the type that apparatus according to the invention is particularly adapted to find.

In FIG. 1 a sample 10, which may, for example, be a coated wire, is assumed continuously moving in the direction of arrow 11. Grounded guide rolls 12 and 13 accurately position the sample material substantially coaxial with respect to a pair of axially spaced tubular sensing electrodes 14 and 15 through which the sample material is pulled under tension. Electrodes 14 and 15 are of electrically conductive material and preferably arranged to present minimum stray (i.e., not via sample) capacitance to ground.

As perhaps seen most clearly in FIG. 2, electrode 14 capacitively coupled with sample 10 and to ground forms one bridge arm, and electrode 15 with sample 10 to ground forms a second bridge arm.

The connections are such that the two remaining bridge arms each comprise a capacitor, 18 and 19, respectively.

The bridge is energized at a common point 20 by an alternating voltage source with respect to ground. In the illustrated embodiment of FIG. 1, low impedance A.C. may be supplied at terminals 21, 22 of a step-up transformer 23 having its secondary in the circuit of point 20 and ground and resonated by the inclusion of a shunt capacitor 23a to reduce the harmonic content of the applied voltage.

The A.C. signal output at the two points 24, 25 of the capacitance bridge is reduced in impedance by cathode followers 26 and 27, to prevent undue attenuation, and particularly to prevent generation of significant signals by movements of cable 10.

The entire capacity bridge and the cathode followers are preferably rigidly mounted in a shielding box, schematically signified by the enclosure 28. The two signals from the bridge may be made equal in the absence of a flaw and their amplitudes generally adjusted conveniently with series potentiometers 30 and 31, whose outputs are subtractively combined in a difference amplifier 32. The difference signal may be conventionally amplified as by stages 33 and 34 and rectified by a solid state bridge 35.

Signals due to flaws quickly charge output capacitors 36 and 37 to a different and higher level than the residual difference voltage produced in the absence of flaw signals and these capacitors can discharge only slowly through resistor 38 and the back-resistance of the rectifying bridge 35. Thus the duration of sizeable signals is increased, preferentially, permitting them to be read effectively by means of a vaccum tube voltmeter amplifier 39 and a meter 40. In most cases it is advantageous to have a contact making meter-relay at 40, so that flaws may initiate desired actions, such as alarm ringing, paint gun spraying, counting, and the like.

As already intimated, FIG. 2 shows the bridge section of the pick-up redrawn to conventional bridge appearance. Capacitors 18 and 19 (assumed fixed) are equal, and when variable (electrode to sample) capacitors 14–10 and 15–10 are equal, bridge output (from the difference amplifier, or between nodes 24 and 25) is null. FIG. 2 also shows the effect of distributed capacitances 14a and 15a, shown here as lumped, with respect to the bridge. If equal they do not affect null significantly, but reduce bridge sensitivity to small changes picked up in either electrode element.

In FIG. 3 is pictured a short length of typical conductive metal coated wire 10, with a somewhat exaggerated flaw 41. When the sample 10 flaw 41 enters electrode 14 (FIG. 1), the capacity between bridge point 24 and ground decreases, resulting in an increased A.C. potential at point 24. The difference signal from difference amplifier 32 thus increases greatly, compared to the percentage change in voltage at point 24 resulting from the flaw. As the flaw progresses through electrode 14, the signal from difference amplifier 32 will return to null value, unless the flaw is longer than the distance between electrodes 14 and 15. As the flaw enters electrode 15, again the difference signal rises, falling again to null as the flaw leaves electrode 15.

In contract to the situation described in the last paragraph, there are several conditions to which this flaw detection technique will not respond, as is advantageous. If, as a result of dirt, wear or other circumstances, the resistance to ground of the sample varies rather severely and abruptly, the A.C. voltage changes at 24 and 25 will soon be approximately equal, and the difference amplifier null output will change only slightly. This is because the resistive impedance along the sample and through rollers to ground may be of the order of magnitude of milli-ohms, whereas the impedances of the capacitance arms may be of the order of thousands of ohms.

Similarly if, due to die wear or other reasons, outside sample diameter should gradually grow larger, no signal will result. Similarly if the sample moves radially, remaining parallel to the electrode axis, such motion will result in only very slight, negligible, signals.

Although prior eddy-current techniques could detect the type of flaw illustrated in FIG. 3, they could not distinguish between such defects and such conditions as poor coating to base metal bonding, high resistance sections in the coating, magnetic and other discontinuities in the base material, etc., and very often the ability to make such distinctions is the criterion of value of the detection equipment.

Thus the capacity pickup embodiment of the invention introduces a technique which disregards magnetic changes and disregards eddy current resistance changes not involving exposed surfaces, because the technique does not employ magnetics. Further, with any embodiment of the invention the two point pickup feature inherently aids in discriminating against side-wise sample motion, stray ambient electrostatic signals, and gradual diameter changes.

There is thus provided improved mechanism of the class described capable of meeting the objects above set forth. While I have illustrated and described particular embodiments, various modifications may obviously be made without departing from the true spirit and scope of the invention intended to be defined by the appended claims.

I claim:
1. In electrical bridge circuit apparatus for the discovery of flaws in a relatively moving sample of completely conductive metallic material,
   four bridge arms in successive adjacency,
   four nodes of juncture established by the successive adjacency of said arms, said nodes comprising first and second nodes which are generally opposite one another and third and fourth nodes which are generally opposite one another and which intervene between the first and second nodes,
   the first node being formed by a totally grounded conductive metallic material sample which is moving and in which is it desired to find a flaw,
   a first one of the arms comprising a capacitor formed by a conductive metallic sensing element and the totally grounded metallic sample, said sensing element surrounding said metallic sample without solid dielectric intervening between sensing element and said sample
   a second of said arms comprising a capacitor formed by another metallic sensing element and the grounded metallic sample without solid dielectric intervening therebetween, said other sensing element surrounding said sample and the two sensing elements being spaced from one another along the direction of sample movement and thus spaced as regards their time of association with any particular flaw,
   a third arm comprising an impedance,
   a fourth arm comprising an impedance which is of the same nature (capacitive, resistive or inductive) and of the same value as the impedance in the third arm,
   means including an A.C. excitation source and connections for applying said source across the opposite first and second nodes,
   means including connections thereto from the third and fourth nodes and from the grounded first node for amplifying and normally cancelling signals associated with one of the sensing elements by signals associated with the other.

2. Apparatus as in claim 1 further characterized by grounded rollers which position and support the sample, the means for applying alternating current energization being likewise grounded to complete the plural parallel capacitive and series connection circuits.

3. Apparatus as in claim 1 further characterized by the means for amplifying and canceling signals comprising a pair of cathode followers having their control grids respectively energized from the junction of first and third arms and the junction of second and fourth arms, said means also having an adjustable difference amplifier having inputs connected to the outputs of said cathode followers, and the apparatus as in claim 10 being further characterized by a meter relay connected to the output of the difference amplifier for responding when a sample flaw is instantaneously associated with one of the sensors and not with the other.

References Cited by the Examiner

UNITED STATES PATENTS

| 2,076,944 | 4/1937 | Howe | 324—61 |
| 2,555,977 | 6/1951 | Kline | 324—61 |
| 2,604,512 | 7/1952 | Bacon et al. | 324—61 |
| 2,802,173 | 8/1957 | Nisle | 324—61 X |
| 2,906,949 | 9/1959 | Shawhan | 324—61 |

FOREIGN PATENTS

| 545,916 | 9/1957 | Canada. |
| 416,308 | 12/1932 | Great Britain. |

FREDERICK M. STRADER, *Primary Examiner.*

WALTER L. CARLSON, *Examiner.*